(12) United States Patent
Nauth (10) Patent No.: US 7,186,426 B2
(45) Date of Patent: Mar. 6, 2007

(54) PREVENTION OF LACTIC ACID BACTERIA SPOILAGE OF BEER THROUGH USE OF BACTERIOCIN-CONTAINING FERMENTED WORT

(75) Inventor: K. Rajinder Nauth, Wheeling, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 1019 days.

(21) Appl. No.: 09/791,350

(22) Filed: Feb. 23, 2001

(65) Prior Publication Data

US 2002/0192331 A1 Dec. 19, 2002

(51) Int. Cl.
C12C 7/28 (2006.01)
C12C 5/02 (2006.01)

(52) U.S. Cl. .......................... 426/16; 426/29; 426/61; 426/330.4

(58) Field of Classification Search ................. 426/16, 426/29, 60, 61, 62, 11, 13, 330.4, 335, 600, 426/592; 435/93, 71.3
See application file for complete search history.

(56) References Cited

U.S. PATENT DOCUMENTS

| | | |
|---|---|---|
| 3,093,551 A | 6/1963 | Hall |
| 3,616,255 A | 10/1971 | Nakagawa |
| 4,073,947 A * | 2/1978 | Witt, Jr. .................. 426/13 |
| 4,584,199 A | 4/1986 | Taylor |
| 4,597,972 A | 7/1986 | Taylor |
| 4,716,115 A | 12/1987 | Gonzalez et al. |
| 4,740,593 A | 4/1988 | Gonzalez et al. |
| 4,906,573 A | 3/1990 | Barney et al. |
| 5,231,165 A | 7/1993 | Vedamuthu et al. |
| 5,445,835 A | 8/1995 | Vedamuthu |
| 5,484,909 A | 1/1996 | Nietupski et al. |
| 5,527,505 A | 6/1996 | Yamauchi et al. |
| 5,594,103 A | 1/1997 | De Vos et al. |
| 5,705,339 A | 1/1998 | Nietupski et al. |
| 5,716,811 A | 2/1998 | Nauth et al. |
| 5,877,272 A | 3/1999 | Vandenbergh et al. |
| 5,895,680 A | 4/1999 | Cirigliano et al. |
| 5,914,248 A | 6/1999 | Kuipers et al. |
| 5,928,946 A | 7/1999 | De Vos et al. |
| 5,972,617 A | 10/1999 | Sami |
| 6,110,509 A | 8/2000 | Nauth et al. |
| 6,113,954 A | 9/2000 | Nauth et al. |
| 6,136,351 A | 10/2000 | Nauth et al. |

FOREIGN PATENT DOCUMENTS

| | | |
|---|---|---|
| EP | 0 186 498 A2 | 2/1986 |
| GB | 844782 | 8/1960 |
| RU | 2059716 | 5/1996 |
| SU | 507055 | 2/1979 |

OTHER PUBLICATIONS

Fowler, G. G., "La Conservation Des Produits Alimentaires Au Moyen de la Nisine" Revue Des Fermentations Et Des Industries Alimentaires, vol. 34, No. 5, 1979, pp. 157-159.
Delves-Broughton, J., "NISIN and Its Uses as a Food Preservative", Food Technology, vol. 44, No. 11, 1990.
Bell, R. G. et al., "The effect of nisin-sodium chloride interactions on the outgrowth of *bacillus licheniformis* spores", Journal of Applied Bacteriology, vol. 159, 1985, pp. 127-132.
Bucic, S. et al., "Individual and Combined Listericidal Effects of Sodium Lactate, Potassium Sorbate, Nisin and Curing Salts at Refrigeration Temperature", Journal of Food Safety, vol. 15, No. 2, 1995, pp. 247-264.
Nykanen, Anne, et al., "The Effect of Lactic Acid, Nisin Whey Permeate, Sodium Chloride and Related Combinations on Aerobic Plate Count and the Sensory Characteristics of Rainbow Trout", Lebensmittel Wissenschaft Und Technologie, vol. 31, No. 3, 1998, pp. 286-290.
Nykanen, A., et al., "Synergistic antimicrobial effect of nisin whey permeate and lactic acid on microbes isolated from fish", Letters in Applied Microbiology 1998, 27, 345-458.

(Continued)

*Primary Examiner*—Keith Hendricks
(74) *Attorney, Agent, or Firm*—Fitch, Even, Tabin & Flannery (57) ABSTRACT

The present invention provides alcoholic beverages which are stabilized against the growth of microorganisms whose growth may cause deterioration of the characteristics of the alcoholic beverages. The stabilized beverages are attained by utilization of a composition which includes a nisin-producing culture and a nutritional supplement in the process of making the alcoholic beverage. The composition of this invention includes nisin at a level effective for inhibiting growth of the spoilage-causing microorganisms, particularly, hardier strains of such microorganisms that may exhibit resistance to lower levels of nisin. The composition is prepared by adding to an aqueous medium, such as wort obtained in the process of making the alcoholic beverage, a nutritional supplement of a type and in an amount that is effective for increasing the yield of nisin, adjusting the pH of the wort to about 6.5, pasteurizing and cooling, inoculating the medium with a culture of nisin-producing microorganism, and fermenting the medium with a nisin-producing culture.

23 Claims, 1 Drawing Sheet

OTHER PUBLICATIONS

Nykanen, A., et al., "Synergistic inhibition of Listeria monocytogenes on cold-smoked rainbow trout by nisin and sodium lactate", International Journal of Food Microbiology, 61 (2000) pp. 63-72.

Hurst, A., "Nisin", Advances in Applied Microbiology, vol. 27, pp. 85-1234.

Lucke et al., "Ecology and Contrl Foods", (A. H.W. Hauschild and K. L. Dodds, eds.) Marcel Dekker, New York, 1993, pp. 177-207. (not current available).

Kalra, M.S. et al., "Stoppage in Increase in Acid Production of Yogurt by Incorporating a Nisin-Producing Culture", Division of Microbiology, National Dairy Research Institute, Karnal (Haryana), Jul. 18, 1974, pp. 71-72.

Smart et al., *J. Appl. Bacteriol.*, 46, pp. 377-383 (1979).

Roberts et al., *J. Food Technol*, 14, 211-226 (1979).

Tompkin, *Food Technology*, 34, pp. 229-236, and 257 (1980).

Bryan et al., Amer Public Health, 61, pp. 1869-1885 (1971) (not currently available).

Microbial Ecology of Food Commodities—Microorganisms in Foods 6: Blackie Academic and Professional, 1998, p. 115 (not currently available).

Kalra et al., (Indian Journal of Dairy Science, 28: 71-72 (1975).

Bayoumi, Chem. Mikrobiol. Technol. Lebensm, 13:65-69 (1991).

Gupta et al., Cultured Dairy Products Journal, 23: 9-10 (1989).

Hogarty et al., J. Food Prot. 45:1208-1211 (1982).

Sadovski et al., XX International Dairy Congress, vol. E, 542-544, 1978 (not currently available).

Muriana et al., J. Food Protection, 58: pp. 1109-1113 (1995).

Brochure—"Specialty Wheat Protein Ingredients for Pasta and Noodle Products", Midwest Grain Products, Inc.

Brochure—"Specialty Wheat Proteins for Food Applications", Midwest Grain Products, Inc.

Brochure—"$P^2$ Pasta Power" —Midwest Grain Products, Inc.

Debbeouz, A., "Comparison of Semolina Fortification With Wheat Glutens and Egg White", North Dakota State University Cereal Science Department, Fargo, North Dakota, Oct. 15, 1996.

Brochure—"Creating Better Solutions Naturally" —Midwest Grain Products, Inc.

Gupta et al., Cultured Dairy Products Journal, 23: pp. 17-18 (1988).

Chung et al., "Effects of Nisin on Grown of Bacteria Attached to Meat", *Applied and Environmental Microbiology*, Jun. 1989, p. 1329-1333..

Maas et al., "Sodium Lactate Delays Toxin Production by *Clostridium botulinum* in Cook-in-Bag Turkey Products", *Applied and Environmental Microbiology*, Sep. 1989, p. 2226-2229.

Kosikowski, Frank, "Bakers', Neufchatel, and Cream Cheese", *Cheese and Fermented Milk Foods*, 2d 1977, pp. 167.

* cited by examiner

FIG. 1

PREVENTION OF LACTIC ACID BACTERIA SPOILAGE OF BEER THROUGH USE OF BACTERIOCIN-CONTAINING FERMENTED WORT

FIELD OF THE INVENTION

This invention relates to the stabilization of alcoholic beverages, especially beer, by inhibiting growth of bacterial contaminants responsible for spoilage. Growth of bacteria, especially hardy strains of lactic acid bacteria including *Pediococcus*, is inhibited through incorporation of a wort composition that includes nisin, derived from a nisin-producing culture, and, preferably, a nutritional supplement for the nisin-producing culture, such as dipotassium phosphate. The invention also relates to methods of stabilizing alcoholic beverages against the growth of spoilage bacteria, wherein the method comprises incorporating nisin derived from a nisin-producing culture and, preferably, a nutritional supplement effective for increasing the yield of nisin during the process of making the alcoholic beverage. The yield of nisin can also be increased by controlling the pH during fermentation. This invention also relates to a nisin-containing wort composition that can be used in the process of making beer.

BACKGROUND OF THE INVENTION

Alcoholic beverages, including beer, generally present a hostile environment for bacterial growth since such beverages tend to be relatively acidic as well as containing hop acids and carbon dioxide. There exist species of bacteria, however, that are known to be capable of surviving and causing spoilage of beer. For example, lactic acid bacteria is capable of growing in wort and causing spoilage of beer.

Prior to beer fermentation, the yeast is harvested and washed with acid to decontaminate the yeast of lactic acid bacteria. Certain strains of *lactobacilli* and *pediococci* may survive the yeast decontamination process. Additionally, these organisms may enter the beer via other ingredients of the ferment. The survival and growth of these bacteria in beer results in appreciable flavor deterioration. To avoid the expense of, and public relation problems associated with, product recalls due to spoilage, the beer must be stabilized against the development of bacteria, including these hardy strains.

Nisin is a peptide-like antibacterial substance produced by microorganisms such as *Lactococcus lactis* subsp. *lactis* (formerly known as *Streptococcus lactis*). Its structure is illustrated in U.S. Pat. No. 5,527,505 to Yamauchi et al. The highest activity preparations of nisin contain about 40 million IU per gram. A commercial preparation, NISAPLIN™, containing about 1 million IU per gram is available from Aplin & Barrett Ltd., Trowbridge, England. Nisin has no known toxic effects in humans. It is widely used in a variety of prepared dairy foods. Experimental use in preserving other foods has also been reported.

A number of efforts have been reported since 1975 directed to reducing uncoupled acid production in dairy fermentations by controlling the post-fermentation acidification of yogurt. In some of these studies, a nisin producing culture was introduced in an attempt to inhibit these effects. Kalra et al. (Indian Journal of Dairy Science, 28: 71–72 (1975)) incorporated the nisin producing culture *Streptococcus lactis* (now known as *L. lactis* subsp. *lactis*) along with the yogurt culture before fermentation. Others introduced nisin in milk prior to fermentation (Bayoumi, Chem. Mikrobiol. Technol. Lebensm., 13:65–69 (1991)) or following fermentation (Gupta et al., Cultured Dairy Products Journal, 23: 17–18 (1988); Gupta et al., Cultured Dairy Products Journal, 23: 9–10 (1989)). In all cases, the rate of post-fermentation acidification was only partially inhibited by these treatments and the yogurt continued to become more acidic throughout its shelf life.

In U.S. Pat. No. 5,527,505, yogurt was produced from raw milk by incorporating a nisin-producing strain, *Lactococcus lactis* subsp. *lactis*, along with the traditional yogurt culture consisting of *Streptococcus salivarius* subsp. *thermophilus* (ST) and *Lactobacillus delbrueckii* subsp. *bulgaricus* (LB). This patent teaches that the *lactococci* are needed to secrete nisin which retards the activity of ST and LB. The resulting yogurt therefore contains the lactococci used to produce the nisin. Nonetheless, the acidity of yogurt containing the nisin-producing bacteria increased by 64 to 96 percent in 14 days in various experiments inoculated with differing amounts of *L. lactis* subsp. *lactis*, compared to the initial acidity at the completion of fermentation. Other studies (Hogarty et al., J. Fd. Prot., 45:1208–1211 (1982); Sadovski et al., XX International Dairy Congress, Vol. E: 542-5–44 (1978)) also noted acid production and development of bitterness at low temperature by some mesophilic starter lactococci in dairy products.

In U.S. Pat. No. 5,015,487, the use of nisin (representative of the class of lanthionine bacteriocins) to control undesirable microorganisms in heat processed meats is disclosed. In tests involving dipping frankfurters in nisin solutions, the growth of *L. monocytogenes* was effectively inhibited upon storage at 4° C.

Chung et al. (Appl. Envir. Microbiol., 55, 1329–1333 (1989)) report that nisin has an inhibitory effect on gram-positive bacteria, such as *L. monocytogenes, Staphylococcus aureus*, and *Streptococcus lactis*, but has no such effect on gram-negative bacteria such as *Serratia marcescens, Salmonella typhimurium*, and *Pseudomonas aeruginosa* when these microorganisms are attached to meat.

Nisin has been added to cheese spreads and other processed foods to inhibit toxin production by *Clostridium botulinum* (U.S. Pat. No. 4,597,972). This patent discloses a detailed example in which chicken frankfurter components are shown to require the presence of both added nitrite and added nisin in order to prevent or delay botulinum toxin production when challenged with *C. botulinum*.

Nisaplin™ has been found to preserve salad dressings from microbiological contamination, such as by *Lactobacillus brevis* subsp. *lindneri*, for an extended shelf life period (Muriana et al., J. Food Protection, 58:1109–1113 (1995)).

More recently, whey from nisin-producing cultures has been used to preserve and stabilize food compositions, including fermented dairy products, mayonnaise-type spreads, cream cheese products, meat compositions, and meat/vegetable compositions. These uses of whey from nisin-producing cultures are described in patents and/or applications entitled "Stabilization of Fermented Dairy Compositions Using Whey from Nisin-Producing Cultures", U.S. Pat. No. 6,136,351 (Oct. 24, 2000); "Stabilization of Mayonnaise Spreads Using Whey from Nisin-Producing Cultures", U.S. Pat. No. 6,113,954 (Sep. 5, 2000); "Stabilization of Cream Cheese Compositions Using Nisin-Producing Cultures", U.S. Pat. No. 6,110,509 (Aug. 29, 2000); and "Stabilization of Cooked Meat Compositions Using Whey From Nisin-Producing Cultures", U.S. patent application Ser. No. 09/386,793, filed Aug. 31, 1999. These patents and/or applications, which are owned by the same assignee as the present invention, are incorporated by reference in their entireties.

Nisin also has been used as an antimicrobial substance in beer. In European patent application EP 0 186 498, Tubb et al. disclose use of nisin to control beer spoilage. Nisin or a nisin-producing culture is added during the brewing process to control the growth of spoilage bacteria. Tubb et al. disclose adding nisin in amounts between 10 and 100 IU per milliliter. Certain strains of *pediococci*, such as Fulton, however, have been found to be resistant to levels of nisin as high as 200 IU of nisin per milliliter. Thus, the teachings of Tubb et al. is ineffective for preventing spoilage of beer by these resistant strains.

There remains a need for compositions and procedures related to alcoholic beverages to enhance stabilization of such beverages. In particular, there is a need for compositions and methods that will inhibit the growth of bacteria that may cause spoilage of alcoholic beverages. Such compositions and methods should be capable of inhibiting the growth of all spoilage bacteria, particularly the more resistant strains of bacteria that may otherwise survive conventional treatment methods. The present invention addresses these needs.

SUMMARY OF THE INVENTION

The present invention provides compositions for enhancing the resistance of alcoholic beverages to spoilage bacteria. In important embodiments, the composition includes nisin derived from a nisin-producing culture for inhibiting growth of spoilage bacteria and preventing spoilage of an alcoholic beverage, such as beer, as well as wort, which is obtained in the process of making the beverage, fortified with a nutritional supplement for increasing the yield of nisin from the nisin-producing culture. The composition is prepared by a process that includes fortifying a light wort with a nutritional supplement, inoculating the fortified wort with a nisin-producing culture, and fermenting the fortified wort, such that the fermented fortified wort includes nisin in an amount effective for inhibiting the growth of spoilage bacteria, including resistant strains of bacteria associated with alcoholic beverage spoilage. The alcoholic beverages of this invention are shelf stable for extended periods of time without appreciable product degradation, such as appreciable changes in flavor and/or aroma.

In other important embodiments, the nutritional supplement of the wort composition is a phosphate compound, such as dipotassium phosphate, monosodium phosphate, ammonium phosphate, calcium phosphate, trisodium phosphate, tetrasodium phosphate, sodium hexametaphosphate, and the like as well as mixtures thereof. Preferably, the composition is fortified with at least about 0.1 percent of the phosphate compound. In another important embodiment, the nutritional supplement increases the yield of nisin so that the composition includes at least about 200 units/ml of nisin, and more preferably, between about 300 units/ml and about 1000 units/ml of nisin.

In other important embodiments, the growth of bacteria chosen from the group of *Pediococcus, Lactobacillus, Leuconostoc, Micrococcus,* and *Streptococcus* is inhibited in the beverage. In a more preferred embodiment, bacteria that may be resistant to lower levels of nisin, including *Pediococcus* (Fulton strain), is inhibited. In additional preferred embodiments, the yield of nisin from the nisin-producing culture is at least about 200 units/ml, and more preferably between about 300 units/ml and about 1000 units/ml so as to inhibit growth of more resistant strains.

The invention also provides a method of inhibiting growth of bacteria for preventing spoilage of an alcoholic beverage. The method includes, in the process of making the beverage, fortifying a light wort with a nutritional supplement that is capable of increasing the yield of a nisin-producing culture, pasteurizing and cooling the fortified wort, inoculating the fortified wort with a nisin-producing culture, fermenting the fortified wort, and utilizing the fermented fortified wort in subsequent steps of the process of making the alcoholic beverage, including yeast fermentation. The fermented fortified wort includes nisin in an amount effective for inhibiting the growth of spoilage bacteria.

In important embodiments, the growth of spoilage bacteria in an alcoholic beverage is inhibited by utilization of a composition that includes a blend of fermented fortified wort as prepared as described herein and unfermented wort. In preferred embodiments, the ratio of fermented fortified wort to unfermented wort is between about 1:1 to about 1:2.

DETAILED DESCRIPTION OF THE INVENTION

This invention relates to stabilization of alcoholic beverages by effectively inhibiting the growth of spoilage bacteria in the beverages. The stabilized beverages are attained through utilization of a wort composition in the process of making the alcoholic beverages. The wort composition includes a nisin-producing culture and a nutritional supplement for increasing the yield of nisin from the culture. The yield of nisin from the nisin-producing culture is effective for inhibiting the growth of bacteria that are known to adversely affect the characteristics of the alcoholic beverages. The alcoholic beverages of this invention are shelf stable for extended periods of time without appreciable product degradation. The compositions and methods of this invention may be used in the process of making either pasteurized or unpasteurized alcoholic beverages.

As used herein, "alcoholic beverage" is intended to include any type of beverage prepared by a fermentation process. Generally, the process of making the alcoholic beverage includes fermentation of sugars by yeast to produce alcohol. The term relates to any beverage made by such a process, including, but not limited to, beer, non-alcoholic beers, malt, wine, cider, distilled products, and the like. Without wishing to limit the scope of this invention, the present invention is described herein for convenience with reference to a stabilized beer and a process of making such a beer; as those skilled in the art will realize, other alcoholic beverages can be prepared using similar techniques and processes.

As used herein, "spoilage bacteria" relates to microorganisms that may grow in the beer. These microorganisms may be introduced into the beer making process along with yeast. Although yeast typically is subject to acid decontamination prior to use, certain microorganisms are known to be able to survive the decontamination process. Additionally, the microorganisms may gain entry through other ingredients of the ferment. These bacteria include lactic acid bacteria and the like, including *Lactobacillus* and *Pediococcus*. In particular, *pediococci* are known to be significant beer spoilage bacteria. Certain strains of this bacteria, such as the Fulton strain of *Pediococcus*, are known to be particularly hardy and able to survive decontamination and other treatment methods.

Incident to the survival and growth of these microorganisms is an appreciable change in the characteristics of the beer. Such changes may relate to a deterioration in the flavor and aroma of the beer, as well as the appearance and physical stability of the beer. As a result of the deterioration, the beer becomes unappealing to consumers or otherwise unfit for consumption, thereby necessitating product recalls that are potentially very costly for the producer of the beer.

To inhibit the growth of spoilage bacteria, nisin is introduced into the beer, preferably during the beer making process, in the practice of this invention. Nisin is introduced during the beer making process through a wort composition. The wort composition includes wort that is inoculated with a nisin-producing culture prior to yeast fermentation. The wort composition provides an amount of nisin effective for inhibiting the growth of spoilage bacteria in the beer. Because certain strains of spoilage bacteria are known to be resistant to lower levels of nisin, increased levels of nisin may be required to inhibit the growth of such bacteria. For example, the Fulton strain of *pediococci* may be resistant to levels of nisin as high as 200 units/ml. As used herein, the terms "unit of nisin," "unit of nisin activity" and "International Unit (IU)," are interchangeable and are equivalent to 0.025 microgram of nisin. A nutritional supplement for the nisin-producing culture is preferably included in the wort composition to increase the yield of nisin in the wort.

As used herein, "nutritional supplement" relates to any composition or substance for increasing the yield of nisin from the nisin-producing culture when added to the wort composition, as compared to the yield of nisin achieved in the absence of the nutritional supplement. Generally, the wort is not a good medium for nisin-producing cultures because the wort is very poor in amino acid nutrition. Although the nisin-producing culture will grow in the wort, it will not excrete noticeable levels of nisin in the medium. In general, nisin-producing cultures will produce less than about 100 units of nisin/ml of wort and, more typically, about 60 units/ml. With addition of a nutritional supplement, however, it is possible to increase the yield of nisin to at least about 200 units/ml, and more preferably to between about 300 and 1000 units/ml.

Such nutritional supplements can include, for example, phosphate compounds, sulfur compounds, calcium chloride, manganese sufate, magnesium sulfate, sodium citrate, ammonium citrate, yeast extract, vegetable and/or plant protein hydrolysate, and the like as well as mixtures thereof. Preferably, the nutritional supplement is a phosphate compound or a sulfur compound. Suitable phosphate compounds include, for example, dipotassium phosphate, monosodium phosphate, ammonium phosphate, calcium phosphate, trisodium phosphate, tetrasodium phosphate, sodium hexametaphosphate, and the like as well as mixtures thereof. Sulfur compounds suitable for use as nutritional supplements include, for example, methionine, cysteine hydrochloride, cysteine, glutathione, methane thiol, methyl sulfide, dimethyl sulfide, 3-methyl thiolpropanol, and the like as well as mixtures thereof. More preferably, the nutritional supplement of the wort composition includes dipotassium phosphate. The nutritional supplement is added in an amount effective for increasing the yield of the nisin-producing culture. Generally the amount of added nutritional supplement is greater than about 0.1 percent. Preferably, the amount of the nutritional supplement added to the wort is between about 0.2 and about 0.6 percent and, more preferably, between about 0.4 and about 0.6 percent, based on the weight of the wort.

As used herein, "wort composition" is intended to include a wort which includes nisin derived from a nisin-producing culture. As used herein, "wort" relates to the liquid recovered from the extraction of grain in the brewing process. Generally, the wort composition is obtained by any of a variety of equivalent procedures involving the fermentation of a nisin-producing microorganism. In one such procedure, a light wort, which includes about 5.5 percent carbohydrate and 9.8 percent protein, is first recovered in the beer making process. The recovered wort may be diluted with an equal volume of water. A nutritional supplement for a nisin-producing culture then is added to the wort in an amount effective for increasing the yield of nisin in the wort composition.

After the pH of the wort is adjusted to about 6.5, the wort is pasteurized by heating at between about 75 and about 95° C., more preferably about 85° C., for about 5 to about 40 minutes, more preferably for about 15 minutes. The wort then is cooled to about 30° C. prior to being inoculated with a nisin-producing culture.

The nisin-producing culture is inoculated with between about $1 \times 10^5$ cfu/ml and about $10 \times 10^6$ cfu/ml and, more preferably, with about $5 \times 10^6$ cfu/ml nisin-producing culture. An example of a nisin-producing microorganism is *Lactococcus lactis* subsp. *lactis*. The inoculated wort is held until the pH drops to about 5.5; such a pH is normally obtained after about 6 to about 7 hours. The pH is maintained at about 5.5 for about 9 to about 10 hours by the addition, as needed, of an appropriate base (e.g., 10 percent aqueous sodium hydroxide), at which time the pH is allowed to drop freely for about 4 hours. The final pH of the wort composition is about 4.8 to about 4.9. The wort composition is then subject to further processing in the beer making process, including the addition of yeast to the wort composition for yeast fermentation.

The fermenting cultures capable of producing the nisin-containing wort composition have the potential of secreting many fermentation products into the wort. Thus, in addition to nisin and lactate, there may be other components present in the wort composition that are produced by the fermentations yielding the wort composition. Among such components may be certain substances which contribute to the beneficial properties of the preservable preparations of the invention and to the beneficial effects of the methods of the invention. Without wishing to limit the scope of this invention, therefore, the term "wort composition" encompasses all components contained therein, both those currently known and those which may remain uncharacterized at the present time, that contribute to the beneficial attributes of the present invention.

Figure 1:
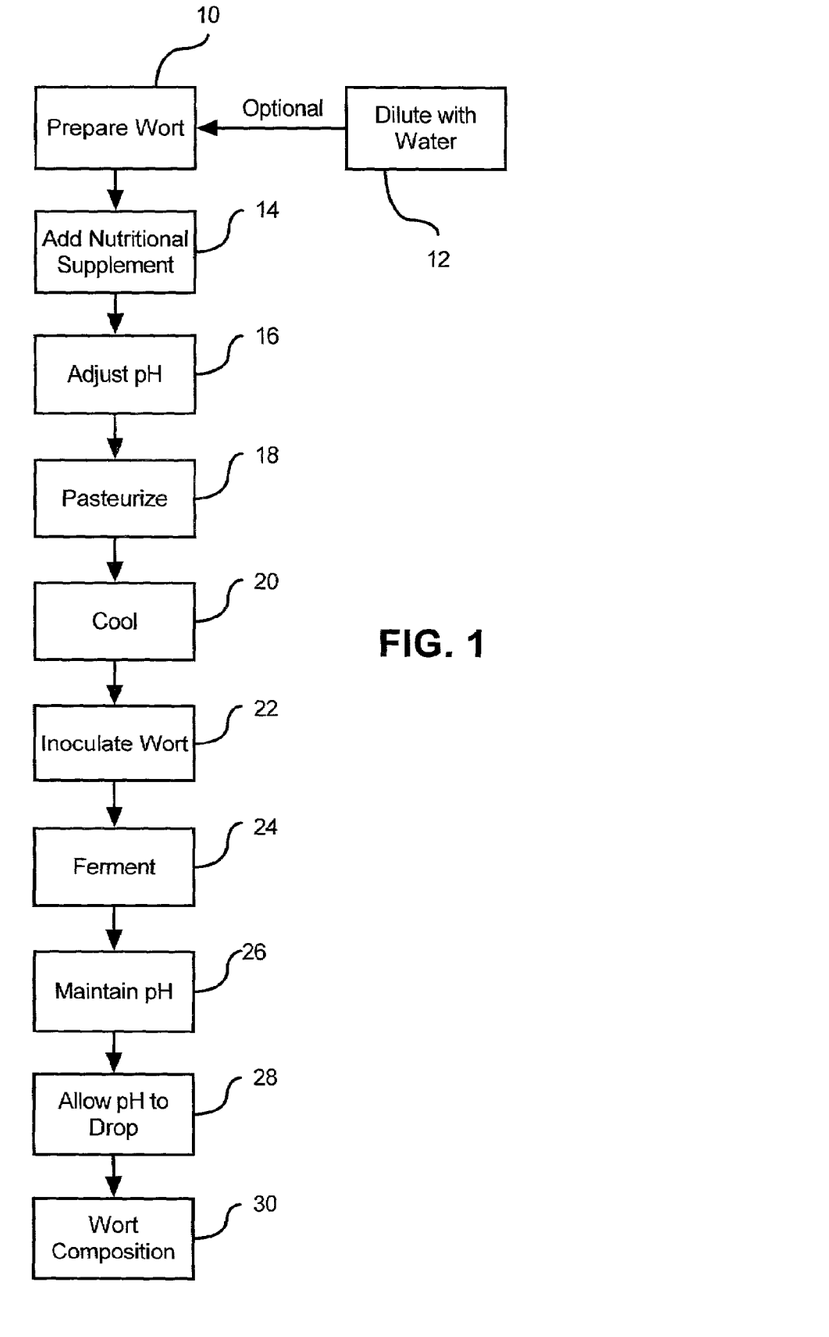
FIG. 1 provides a flow chart illustrating a preferred process for the production of wort compositions for inhibiting the growth of spoilage bacteria in accordance with the present invention.

Stabilization of beer against growth of spoilage bacteria is shown in the present invention to result from the utilization of a wort composition that includes a nisin-producing culture and a nutritional supplement during the beer making process. As shown in FIG. 1, the wort composition used in this invention may be obtained using a procedure that includes the following steps (reference numbers from FIG. 1 are in bold): (i) preparing a light wort 10 according to a typical process for making beer and, optionally, diluting the light wort 12 with preferably no more than equal parts of distilled water; (ii) adding an amount of nutritional supplement 14; (iii) adjusting the pH 16 to about 6.5; (iv) pasteurizing the light wort 18 and cooling 20; (v) inoculating the wort with a culture of nisin-producing microorganism 22;

(vi) fermenting the wort 24 with a nisin-producing culture and a phosphate compound until the pH falls to a range of about 5.5 to about 5.9; (vii) maintaining the pH 26 at about 5.5 to about 5.9 for about 9 to about 10 hours; and (viii) allowing the pH 28 to fall for about 4 hours to a pH of about 4.8 or lower. A fermented wort composition 30 results. Yeast subsequently is added to the wort composition for yeast fermentation in accordance with the conventional process of making beer.

Alternatively, the resulting wort composition first may be blended with an unfermented wort to provide a wort blend to which yeast then is added for yeast fermentation. The undiluted wort may be blended with the wort composition preferably in no more than an amount sufficient to maintain a level of nisin in the final wort blend that is effective for inhibiting even the hardier strains of spoilage bacteria. Preferably, the ratio of fermented wort composition to unfermented wort is between about 1:1 and about 1:2 and, more preferably is about 3:5. Preferably, the level of nisin in the wort blend is at least about 300 units/ml.

EXAMPLES

The following examples are intended to illustrate the invention and not to limit or otherwise restrict the invention. Unless otherwise noted, all percentages and ratios in this specification are by weight.

General Methods. Nisin-producing *lactococci* were enumerated on MRS agar (Difco) after incubation at 32° C. for 36 to 48 hours. Nisin activity was determined using the method of Fowler et al., "The Assay of Nisin in Foods," Techn. Series, Soc. Bacteriol., 8: 91–105 (1975), which is hereby incorporated by reference. A sensitive strain of *Lactococcus lactis* subsp. *cremoris* was used as an indicator. Nisaplin™, a standarized preparation of nisin (about $10^6$ units/g) from Aplin & Barrett Ltd. (Trowbridge, England), was used as a standard to determine nisin activity in various preparations.

Example 1

This example illustrates the sensitivity of strains of *Pediococcus* expected to be present in untreated beer. A list of the strains, which were obtained from Miller Brewing Company, is set forth in Table 1. The strains were assayed for their sensitivity to nisin at 200 units of nisin/ml. Many of the strains were only weakly sensitive to this level of nisin, showing inhibition zones of about 10 mm diameter or greater around wells containing 200 units/ml of nisin. Several of the strains (i.e., Fulton, PP40, IRW 8/4, and Cerwinka) were resistant to this level of nisin, showing no zone of inhibition.

TABLE 1

Measure of nisin sensitivity of *pediococci* isolated from beer.

| Pediococcus Strains | Zone of Inhibition (mm) at 200 nisin units/ml |
|---|---|
| PP46-*P. damnosus* 25248 | 9.48 |
| PP47-*P. pentosaceus* 10791 | 8.04 |
| PP48-*P. damnosus* 29359 | 21.36 |
| PP49-*P. damnosus* 11308 | 13.4 |
| PP53-IRW ex Keg 8/18 | 14.2 |
| IRW Premier (2) | 18.91 |
| EP 103A | 16.58 |
| RB 2 | 19.2 |
| Fulton | no zone |

TABLE 1-continued

Measure of nisin sensitivity of *pediococci* isolated from beer.

| Pediococcus Strains | Zone of Inhibition (mm) at 200 nisin units/ml |
|---|---|
| QPN | 13.19 |
| Eden 103G | 13.85 |
| Coors | 11.65 |
| Belgium | 16.2 |
| Trenton | 16.89 |
| FWP | 16.52 |
| PP40 | no zone |
| IRW 8/4 | no zone |
| IRW 8/18 premier | 14.25 |
| RBI | 7.1 |
| Albany (2) | 16.7 |
| Albany 8/20 | 16.38 |
| PD 25249 | 18.62 |
| EP 404 | 12.99 |
| IRW 267 | 16.15 |
| Cerwinka | no zone |

Example 2

This example illustrates the production of nisin in a wort inoculated with a nisin-producing culture. The wort was supplied by Miller Brewing Company. The initial pH of the wort was about 5.0, and was adjusted to about 6.4 with a 10 percent solution of NaOH. Both an undiluted wort and a wort that was diluted with an equal part of distilled water were inoculated with a nisin-producing culture at about $10^5$ cfu/ml. As shown in Table 2, although the nisin-producing culture grew in the wort, it did not excrete noticeable levels of nisin. Only about 60–70 units of nisin were produced with a population of about $3–4\times10^6$ cfu/ml. These low levels of nisin are barely detectable and are anticipated to be easily overcome by the more resistant strains of bacteria, especially strains such as the Fulton strain of *Pediococcus*.

TABLE 2

Nisin production potential of wort.

| Sample | pH at 16 hours | Nisin activity (units/ml) | Population (cfu/ml) |
|---|---|---|---|
| Wort | 4.7 | 61 | $3.0 \times 10^6$ |
| Wort + Water (1:1) | 4.3 | 67 | $4.0 \times 10^6$ |

Example 3

A detailed analysis of the nutritional components of a wort obtained from the Miller Brewing Company is set forth in Table 3. Amino acids generally are lacking in the wort or are present in only very low levels. Thus, the wort was shown to be a poor medium for nisin-producing cultures because of the poor amino acid nutrition.

TABLE 3

Composition of wort.

| Description | Amount |
|---|---|
| Carbohydrates | 5.5% |
| Protein | 9.8% |
| Aminonitrogen | 230 µg/g |
| Aspartic/Asparagine | 0.000 mole % |

TABLE 3-continued

Composition of wort.

| Description | Amount |
| --- | --- |
| Threonine | 0.00 mole % |
| Serine | 0.00 mole % |
| Glutamic/Glutamine | 0.00 mole % |
| Proline | 119.57 mole % |
| Glycine | 0.00 mole % |
| Alanine | 0.00 mole % |
| Valine | 0.00 mole % |
| Methionine | <9.23 mole % |
| Isoleucine | 0.00 mole % |
| Leucine | 0.00 mole % |
| Tyrosine | 0.00 mole % |
| Phenylalanine | 0.00 mole % |
| Histidine | 0.00 mole % |
| Lysine | 0.00 mole % |
| Ornithine | 0.00 mole % |
| Arginine | 0.00 mole % |
| Total Amino Acids | 100.00 mole % |
| Moisture | 84.6% |
| Calcium | 50 ppm |
| Phosphorus | 186 ppm |
| Fructose | 0.2% |
| Glucose | 5.9% |
| Sucrose | <0.1% |
| Lactose | <0.1% |
| Maltose | 4.0% |
| Citric Acid | <0.01% |
| Malic Acid | <0.01% |
| Acetic Acid | <0.01% |
| Tartaric Acid | <0.01% |
| Niacin | 0.96 mg/100 g |
| Riboflavin | 0.02 mg/100 g |
| Thiamin | 0.06 mg/100 g |

Example 4

This example illustrates the effect of addition of a nutritional supplement on production of nisin. Wort diluted with equal parts of distilled water was inoculated with a nisin-producing culture at $5\times10^6$ cfu/ml. The inoculated wort was incubated at 30° C. for 16 hours. Nisin levels in the wort were measured by well assay using a nisin standard curve. A comparison of nisin production levels obtained with various supplements added to the wort is set forth in Table 4.

After 16 hours, the pH of the control wort was about 4.38, and the cell population was about $3\times10^7$ cfu/ml. No nisin was detected in the control wort. In a second run, 0.2 percent dipotassium phosphate was added to the wort prior to inoculation. After 16 hours, the pH of the second wort was about 4.3, and the cell population was about $2\times10^8$ cfu/ml. About 309 units of nisin/ml were produced. In a third run, 0.2 percent dipotassium phosphate and 0.2 percent yeast extract were added to the wort prior to inoculation. After 16 hours, the pH of the third wort was about 4.36, and the cell population was about $3\times10^8$ cfu/ml. About 284 units of nisin/ml were produced. In a fourth run, 0.2 percent dipotassium phosphate, 0.2 percent yeast extract and 0.2 percent casein hydrolysate were added to the wort prior to inoculation. After 16 hours, the pH of the fourth wort was about 4.28, and the cell population was about $4\times10^8$ cfu/ml. About 272 units of nisin/ml were produced.

TABLE 4

Evaluation of nutritional supplements in diluted wort (1:1) on the growth and production of nisin by a nisin producing lactococci.

| Sample | Population at 16 hours (cfu/ml) | pH | Nisin Level (units/ml) |
| --- | --- | --- | --- |
| Wort (diluted) | $3 \times 10^7$ | 4.38 | barely detectable |
| Wort (diluted) + 0.2% $K_2HPO_4$ | $2 \times 10^8$ | 4.30 | 309 |
| Wort (diluted) + 0.2% $K_2HPO_4$ + 0.2% yeast extract | $3 \times 10^8$ | 4.36 | 284 |
| Wort (diluted) + 0.2% $K_2HPO_4$ + 0.2% yeast extract + 0.2% casein hydrolysate | $4 \times 10^8$ | 4.28 | 272 |

Example 5

This example evaluates the effectiveness of sulfur compounds as nutritional supplements for nisin-producing cultures. Wort was fortified with 0.2 percent dipotassium phosphate. In separate runs, sulfur compounds also were added to the wort at 0.3 percent. The wort was inoculated with a nisin-producing culture at $5\times10^6$ cfu/ml. The inoculated wort was allowed to incubate for 16 hours at 30° C. After 16 hours, the pH of the wort in each of the runs was about 4.3, and the cell population was between about $1.4\times10^8$ and $2.0\times10^8$ cfu/ml. The level of nisin produced in each of the runs, including the control wort, was between about 260 and about 325 units/ml. Addition of a sulfur compound to the wort was not shown to increase nisin production. Further, addition of 0.2 percent yeast extract after 16 hours resulted in decreased nisin production but did not affect cell growth.

TABLE 5

Evaluation of sulfur compounds as nutritional supplements in diluted wort on the production of nisin by a nisin producing lactococci.

| Additive | pH at 16 hours | Population (cfu/ml) at 16 hours | Nisin Level (units/ml) |
| --- | --- | --- | --- |
| Wort | 4.30 | $1.4 \times 10^8$ | 283 |
| Wort + methionine | 4.30 | $1.6 \times 10^8$ | 311 |
| Wort + cysteine HCl | 4.32 | $1.0 \times 10^8$ | 326 |
| Wort + cysteine | 4.32 | $1.8 \times 10^8$ | 324 |
| Wort + glutathione | 4.32 | $2.0 \times 10^8$ | 259 |

Example 6

This example illustrates the effect of increasing the amount of phosphate compound in the wort on production of nisin. Wort diluted with equal parts of distilled water was inoculated with a nisin-producing culture at $5\times10^6$ cfu/ml. The inoculated wort was incubated at 30° C. for 16 hours. Nisin levels in the wort were measured by well assay using a nisin standard curve. A comparison of nisin production levels obtained with various amounts of phosphate compound (ranging between about 0.4 and about 0.6 percent) added to the wort is set forth in Table 6. After 16 hours, the pH of the wort in each of the runs was about 4.3, and the cell population was between about $5\times10^8$ to $9\times10^8$ cfu/ml. The level of nisin produced in each of the runs was between about 325 and about 350 units/ml.

TABLE 6

Effect of dipotassium hydrogen phosphate in wort on growth and nisin yield by *Lactococcus* culture.

| Phosphate Level | pH at 16 hours | Population (cfu/ml) at 16 hours | Nisin Level (units/ml) |
|---|---|---|---|
| 0.4% | 4.30 | $5 \times 10^8$ | 350 |
| 0.5% | 4.31 | $9 \times 10^8$ | 326 |
| 0.6% | 4.36 | $8 \times 10^8$ | 353 |

Example 7

The preparation of a wort composition that provides increased nisin production is shown in Table 7. Dipotassium phosphate at 0.4 percent was added to wort diluted with equal parts of distilled water. The wort was inoculated with a nisin-producing culture at $5 \times 10^6$ cfu/ml and incubated at 30° C. The pH of the wort was allowed to drop to about 5.5, and then was maintained at 5.5 for about 10 hours. After 10 hours, the pH was allowed to drop for about 4 hours to the final pH of about 4.8. The nisin level was about 760 units/ml at a population of about $3.5 \times 10^9$ cfu/ml.

TABLE 7

Conditions of pH controlled propagation of *Lactococcus* culture in wort and its impact on nisin yield.
Wort: Diluted 1:1 with distilled water;
Dipotassium phosphate added at 0.4%

| | |
|---|---|
| Starting pH | 6.6 |
| Inoculation | $5 \times 10^6$ cfu/ml |
| Temperature of incubation | 30° C. |
| Time to pH 5.5 | 6 hours, 40 minutes |
| Hold at pH 5.5 by addition of 10% NaOH as needed | 10 hours, then allowed time for pH to drop |
| Final pH | 4.85 |
| Final cell population | $3.5 \times 10^9$/ml |
| Nisin level | 760 units/ml |

In the fermentation of wort without phosphate compounds (e.g., dipotassium phosphate), there is usually a rapid growth of nisin-producing organisms until the pH drops to about 4.3. Once the pH reaches this level, little additional physiological activity appears to occur. A similar fermentation of wort without any added phosphate compounds yielded reduced nisin levels (i.e., about 630 units/ml). Thus, it appears that phosphate compounds act as a nutrient and that the majority of nisin is produced under more favorable physiological conditions (i.e., pH of about 5.5).

Example 8

This example illustrates the effect that a fermented wort has on yeast, as well as on *Pediococcus*. Wort blends of (a) equal parts fermented wort composition and unfermented wort, and (b) 1:1.5 parts fermented wort composition to unfermented wort were inoculated with yeast at about $10^5$ cfu/ml. The two wort blends also were inoculated with *Pediococcus* at about $10^3$ cfu/ml. The blends were incubated at about 30° C. for 24 hours. The levels of yeast and *Pediococcus* in the two blends after incubation are set forth in Table 8.

TABLE 8

Effect of nisin fermented wort on yeast and nisin-resistant *Pediococcus*.

| | Yeast | *Pediococcus* (cfu/ml) |
|---|---|---|
| Fermented wort: unfermented wort (1:1) | $3.2 \times 10^7$ | None detected |
| Fermented wort: unfermented wort (1:1.5) | $4.0 \times 10^7$ | None detected |

Example 9

This example illustrates the effect of a wort blend on the growth of *Pediococcus*. A 1:1.5 blend of fermented wort composition to fermented wort was inoculated with about 100 cfu/ml *Pediococcus*. The *Pediococcus* declined in numbers over time, as set forth in Table 9. Nisin activity at 72 hours was about 300 units. In an unfermented wort, the level of *Pediococcus* after 48 hours at 30° C. was about $8 \times 10^7$ cfu/ml.

TABLE 9

Fate of *Pediococcus* (Fulton) in the wort blend, fermented wort: unfermented wort (1:1.5), held at 30° C.

| Time (hr) | *Pediococcus* (cfu/ml) |
|---|---|
| 0 | 130 |
| 24 | 70 |
| 48 | + (able to grow in MRS broth) |
| 72 | 30 |

Example 10

This example illustrates the effectiveness of fermentation by a nisin-producing culture in controlling growth of *Pediococcus* without inhibiting alcohol production. Both the unfermented wort and the fermented wort blend were inoculated with yeast and *Pediococcus* at about $10^4$ cfu/ml for each culture. Nisin activity initially was about 300 units. The inoculated wort and wort blend were incubated for 4 days at about 25° C. A comparison of the effects of the wort and the wort blend on growth of *Pediococcus* and yeast, and thereby on alcohol production, is set forth in Table 10.

TABLE 10

Fate of yeast and *Pediococcus* in wort and blend of fermented wort and wort (1:1).

| Wort | Yeast (cfu/ml) | *Pediococcus* (cfu/ml) | Alcohol g/l |
|---|---|---|---|
| Wort | $1.4 \times 10^6$ | $8 \times 10^4$ | 40 |
| Fermented wort: wort (1:1) | $1.5 \times 10^6$ | $4 \times 10^2$ | 43 |

That which is claimed is:

1. A method of inhibiting growth of bacteria for preventing spoilage of an alcoholic beverage, the method comprising the steps of:
   (a) providing a wort as an aqueous medium;
   (b) inoculating the aqueous medium with a nisin-producing culture for production of nisin;
   (c) fermenting the inoculated medium; and (d) further processing the fermented wort medium to make the alcoholic beverage;

wherein the fermented medium includes nisin derived from the nisin-producing culture in an amount of at least about 200 units of nisin/ml and effective for inhibiting the growth of spoilage bacteria.

2. The method of claim 1, wherein the method further comprises fortifying the aqueous medium with a nutritional supplement prior to inoculating the aqueous medium with the nisin-producing culture, wherein the nutritional supplement is of a type and in an amount effective for increasing yield of a nisin-producing culture as compared to the yield obtained in the medium without the nutritional supplement.

3. The method of claim 1, wherein fermentation of the inoculated medium includes the steps of:
   (a) maintaining the pH of the inoculated medium at about 5.5 for about 4 to about 10 hours; and
   (b) allowing the pH of the inoculated medium to drop to about 4.9 or lower.

4. The method of claim 2, wherein fermentation of the inoculated medium includes the steps of:
   (a) maintaining the pH of the inoculated medium at about 5.5 for about 4 to about 10 hours; and
   (b) allowing the pH of the inoculated medium to drop to about 4.9 or lower.

5. The method of claim 2, wherein the nutritional supplement includes a phosphate compound.

6. The method of claim 4, wherein the nutritional supplement includes a phosphate compound.

7. The method of claim 5, wherein the medium is fortified with at least about 0.1 percent of the phosphate compound.

8. The method of claim 6 wherein the medium is fortified with between about 0.2 to about 0.6 percent of the phosphate compound.

9. The method of claim 5, wherein the phosphate compound is dipotassium phosphate.

10. The method of claim 6, wherein the phosphate compound is dipotassium phosphate.

11. The method of claim 1, wherein the fermented medium does not affect alcohol production by yeast in the process of making the alcoholic beverage.

12. The method of claim 2, wherein the yield of nisin is between about 300 and 1000 units/ml.

13. The method of claim 3, wherein the yield of nisin is between about 300 and 1000 units/ml.

14. The method of claim 4, wherein the yield of nisin is between about 300 and 1000 units/ml.

15. The method of claim 1, wherein the alcoholic beverage is beer and the medium is wort.

16. The method of claim 1 further comprising the steps of:
   (a) adjusting the pH of the aqueous medium to about 6.5;
   (b) heating the aqueous medium to about 85° C. for a time sufficient for pasteurizing the aqueous medium; and
   (c) cooling the aqueous medium;
   wherein the steps of adjusting pH, heating and cooling are completed prior to inoculation of the aqueous medium with nisin-producing culture.

17. The method of claim 2 further comprising the steps of:
   (a) adjusting the pH of the fortified medium to about 6.5;
   (b) heating the aqueous medium to about 85° C. for a time sufficient for pasteurizing the aqueous medium; and
   (c) cooling the aqueous medium;
   wherein the steps of adjusting pH, heating and cooling are completed prior to inoculation of the fortified medium with nisin-producing culture.

18. The method of claim 3 further comprising the steps of:
   (a) adjusting the pH of the aqueous medium to about 6.5;
   (b) heating the aqueous medium to about 85° C. for a time sufficient for pasteurizing the aqueous medium; and
   (c) cooling the aqueous medium;
   wherein the steps of adjusting pH, heating and cooling are completed prior to inoculation of the aqueous medium with nisin-producing culture.

19. The method of claim 15, wherein an amount of unfermented wort effective for maintaining a predetermined level of nisin is blended with the resulting fermented medium prior to utilization of the medium in the process of making the beverage.

20. The method of claim 19, wherein the unfermented wort is blended in a ratio of between about 1:1 to about 1:2 fermented medium to unfermented wort.

21. The method of claim 1, wherein growth of bacteria chosen from the group consisting of *Pediococcus, Lactobacillus, Leuconostoc, Micrococcus*, and *Streptococcus* is inhibited in the beverage.

22. The method of claim 2, wherein growth of bacteria chosen from the group consisting of *Pediococcus, Lactobacillus, Leuconostoc, Micrococcus*, and *Streptococcus* is inhibited in the beverage.

23. The method of claim 3, wherein growth of bacteria chosen from the group consisting of *Pediococcus, Lactobacillus, Leuconostoc, Micrococcus*, and *Streptococcus* is inhibited in the beverage.

* * * * *

UNITED STATES PATENT AND TRADEMARK OFFICE
CERTIFICATE OF CORRECTION

| | | |
|---|---|---|
| PATENT NO. | : 7,186,426 B2 | Page 1 of 1 |
| APPLICATION NO. | : 09/791350 | |
| DATED | : March 6, 2007 | |
| INVENTOR(S) | : Nauth | |

It is certified that error appears in the above-identified patent and that said Letters Patent is hereby corrected as shown below:

On Title page, col. 2 (Foreign Patent Documents), line 4, delete "SU" and insert -- RU -- .

On Title page, col. 2 (Other Publications), line 9, delete "Bucic" and insert -- Buncic -- .

Signed and Sealed this

Fifteenth Day of May, 2007

JON W. DUDAS
*Director of the United States Patent and Trademark Office*